United States Patent [19]
Otaki

[11] Patent Number: 6,069,983
[45] Date of Patent: *May 30, 2000

[54] IMAGE DATA TRANSMITTING/RECEIVING APPARATUS

[75] Inventor: Mitsuhiko Otaki, Ayase, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/802,986

[22] Filed: Feb. 21, 1997

[30] Foreign Application Priority Data

Feb. 26, 1996 [JP] Japan .................................. 8-038106

[51] Int. Cl.[7] .................................................. H04N 1/393
[52] U.S. Cl. .......................... 382/296; 358/448; 358/451; 382/299
[58] Field of Search .................................. 358/448, 449, 358/450, 451, 474; 382/296, 297, 298, 299; H04N 1/387, 1/40, 1/04, 1/393

[56] References Cited

U.S. PATENT DOCUMENTS 5,521,720   5/1996   Yoshida .................................. 358/448

FOREIGN PATENT DOCUMENTS

| 0 249 948 | 6/1987 | European Pat. Off. . |
| 0 626 777 | 5/1994 | European Pat. Off. . |
| 63-33348 | 7/1988 | Japan . |
| 5-110814 | 4/1993 | Japan . |

*Primary Examiner*—Kim Yen Vu
*Attorney, Agent, or Firm*—Foley & Lardner

[57] ABSTRACT

It is determined whether the long sides of a document are parallel to the main or sub scanning direction of a scanner to set resolutions of image data along the short and long sides of the document while the image data is being facsimiled. When the long sides of the document is parallel to the main scanning direction, the scanner scans the document in the main scanning direction by the resolution along the long sides and in the sub scanning direction by the resolution along the short sides to read the image data. The image data is rotated 90 degrees, and the rotated image data is facsimiled in the A4-R direction based on the ITU's recommendation. The image data is not degraded when it is rotated but can be transmitted in good quality.

15 Claims, 6 Drawing Sheets

IMAGE DATA TRANSMITTING/RECEIVING APPARATUS

BACKGROUND OF THE INVENTION

The present invention relates to an image data transmitting/receiving apparatus incorporated in an electronic copy machine having a copy function, a printer function, etc.

It is generally known that a multi-purpose apparatus fulfilling a facsimile function, a copy function, a printer function, and the like has a so-called memory transmission mode in which an image read by a scanner is stored once in a memory and its corresponding image data is transmitted.

Under the ITU's (International Telecommunications Union) recommendation, in the facsimile function of the multi-purpose apparatus, an A4-sized document is usually placed lengthways toward the scanner (referred to as "in A4-R direction" which means that the scanning distance of the scanner in the subscanning direction is longer than that in the main scanning direction), and an image is read therefrom and transmitted.

A long scanning time is required to read an image from the A4-sized document placed in the A4-R direction. Conventionally, therefore, when an image is read out from the A4-sized document placed widthways toward the scanner (referred to as "in A4-Y direction" which means that the scanning distance of the scanner in the main scanning direction is longer than that in the subscanning direction), it is transmitted as data for an A3-sized sheet. However, the reception of image in A3 size is one option, and there are many cases where a receiver is unable to receive image data in size of A3. In these cases, the read image data has only to be rotated. For example, if image data read from an A4-sized document set in the A4-Y direction is rotated 90° (or 270°), its direction will be the same as that of image data read in the A4-R direction on the ITU's recommendation.

However, in order to rotate an image whose resolution varies between the main scanning and subscanning, the resolution need to be changed and the image may be degraded accordingly. For example, an image, which is read by main scanning 1 (resolution 8 lines/mm) indicated by arrow a and subscanning 1 (resolution 15.4 lines/mm) indicated by arrow b, as shown in FIG. 7A, is rotated and converted into an image of main scanning 2 (resolution 8 lines/mm) and subscanning 2 (resolution 15.4 lines/mm), as shown in FIG. 7B. In actuality, the image has to be reduced 52% (8/15.4) from subscanning 1 to main scanning 2 and enlarged 192% (15.4/8) from main scanning 1 to subscanning 2. When the image is reduced 52% as illustrated in FIGS. 7C and 7D, an image is degraded due to a missing line or the like. To prevent this, a line holding circuit can be added, but the cost is increased.

As described above, the conventional apparatus has the drawback wherein if an image read from a document scanned in the A4-Y direction by a scanner is facsimiled in the A4-R direction based on the ITU's recommendation, the image is degraded when it is rotated.

BRIEF SUMMARY OF THE INVENTION

It is accordingly an object of the present invention to provide an image data transmitting/receiving apparatus capable of preventing an image from being degraded due to its rotation and conversion when the image is read in the A4-Y direction and facsimiled in the A4-R direction based on the ITU's recommendation.

In order to achieve the above object, according to one aspect of the present invention, there is provided an image data transmitting/receiving apparatus, comprising:

means for scanning a document to read image data thereof;

means for controlling the scan means such that a resolution of the image data of the document scanned by the scan means corresponds to a resolution of rotated image data;

means for rotating the image data of the document scanned by the scan means; and means for transmitting the image data rotated by the image rotation means to an external device.

According to another aspect of the present invention, there is provided an image data transmitting/receiving apparatus comprising:

a scanner for scanning a document having long sides and short sides in a main scanning direction and a sub scanning direction to read image data of the document;

means for determining whether the long sides of the document are parallel to the main scanning direction or the sub scanning direction;

means for setting a resolution of the image data along the short sides and a resolution of the image data along the long sides during transmission of the image data;

means for controlling the scanner such that when the long sides of the document are parallel to the main scanning direction, the scanner scans the document in the main scanning direction by the resolution along the long sides and scans the document in the sub scanning direction by the resolution along the short sides, thereby to read an image;

means for rotating the image data of the document scanned by the scanner through 90 degrees to provide rotated image data; and means for transmitting the rotated image data to an external device.

According to the image data transmitting/receiving apparatus having the above constitution, even when a document set in the A4-Y direction is scanned to read image data and the image data is rotated and facsimiled in the A4-R direction using an ADF or the like by the facsimile function of a compound copy machine, a formed image is not degraded. A user is able to correctly transmit image data, regardless of whether a document is set in the A4-R or A4-Y direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
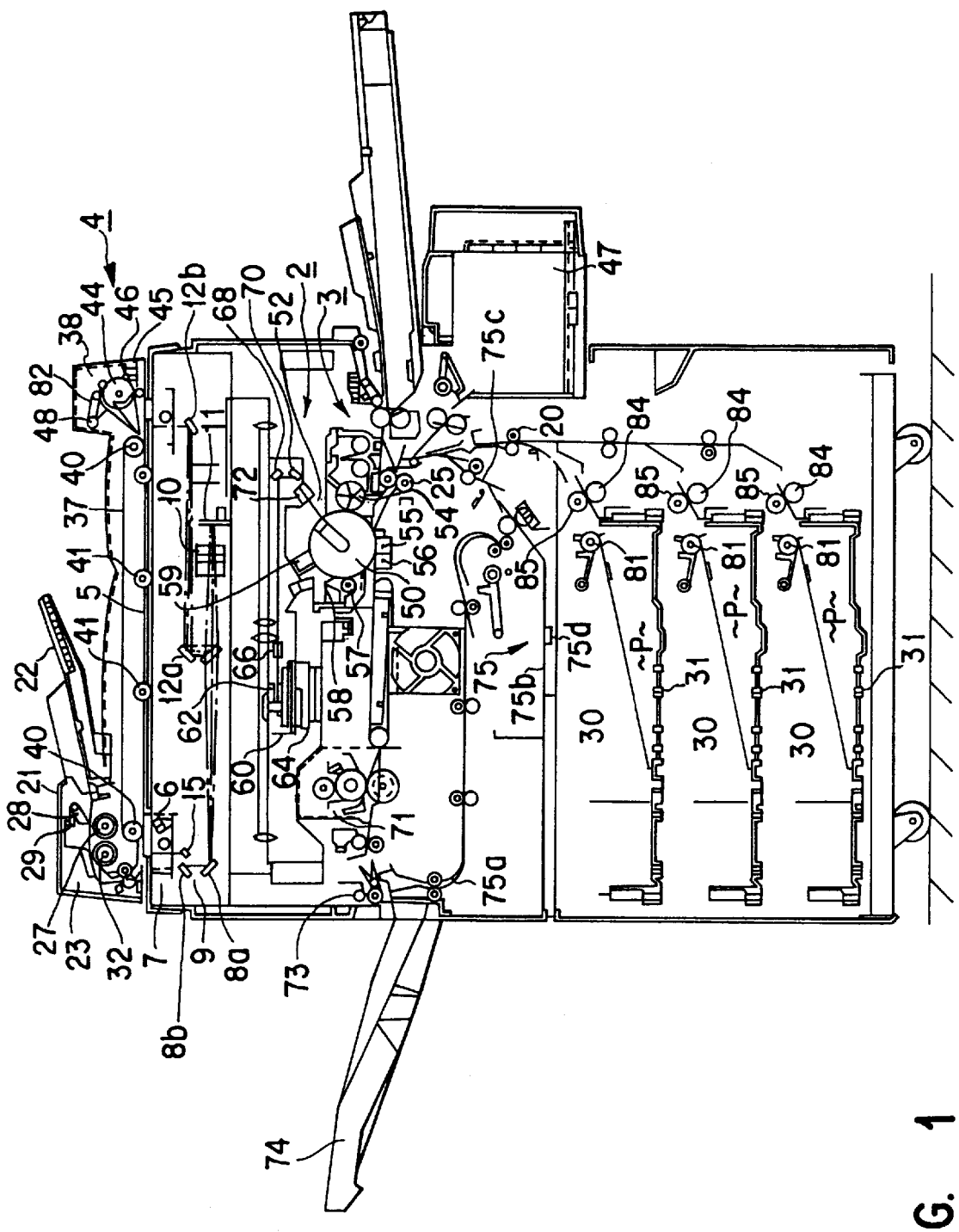
FIG. 1 is a view schematically showing the entire constitution of an electronic copy machine as an image data transmitting/receiving apparatus of the present invention.

FIG. 1 schematically shows the entire constitution of an electronic copy machine as an image data transmitting/receiving apparatus of the present invention. This machine comprises a scanner 2 and a printer 3, and an ADF (automatic document feeder) 4 is provided thereon.

In the ADF 4, the trailing edge of a cover body 21 serving as a housing is rotatably attached to the upper trailing edge of the machine by means of a hinge device. The ADF 4 is so constituted that a document table 5 can be opened when the need arises. A document feeding table 22 for holding a plurality of documents at the same time is provided on the somewhat left-hand side of the upper surface of the cover body 21. A feeder means 23 for picking up the documents one by one and supplying them to one end side (left-hand side of FIG. 1) of the document table 5 is mounted on one end side of the machine. The feeder means 23 includes a pickup roller 27 for picking up the documents, a weight plate 28 for pushing the documents against the pickup roller 27, and an empty sensor 29 serving as a document sensor for sensing the documents set on the document feeding table 22. The document feeding table 22 has a sensor (not shown) for sensing the size (A4-R, A4-Y, A3, etc.) of a set document in order to automatically sense the size of the document.

A feeding roller 32 is arranged in which direction the documents are picked up by the pickup roller 27, in order to reliably feed the documents one by one. A document carrying belt 37 extends so as to cover the upper surface of the document table 5. The belt 37 includes a pair of belt rollers 40 and a broad, endless belt put on the rollers 40. The outside of the endless belt is white. The belt 37 is thus capable of running in forward and backward directions by a belt driving mechanism (not shown). A plurality of belt press rollers 41 for pressing the belt on the document table 5 and a set switch (not shown) for sensing the opening and closing states of the ADF 4 are formed on the inside of the belt 37. The documents supplied to the one end (left-hand) side of the document table 5 by the feeder means 23, are carried to the other end (right-hand) side thereof. A discharger means 38 is provided on the right-hand side of the machine, and includes a carrying roller 44, a pinch roller 45 for pressing the documents on the carrying roller 44, and a discharge sensor 46 serving as a document sensing means for sensing the trailing edges of the documents supplied in the discharge direction. A discharge roller 48 is provided on the downstream side of a document discharge path. The document discharge path has a gate 82 for guiding a document to the document table 5 upside down to enable both faces of the document to be copied.

The scanner 2 includes an exposure lamp 6 used as a light source, a first carriage 7 with a mirror 15, a second carriage 9 with mirrors 8a and 8b by which a light path is turned, a lens 10, a CCD line sensor 11 for receiving reflected light, a driving system (not shown) for changing positions of these components, and an A/D converter (not shown) for converting an output of the CCD line sensor 11 or image data (information) from analog data to digital data. The first and second carriages 7 and 9 are connected to each other by a timing belt (not shown), and the second carriage 9 moves in the same direction at half the speed of the second carriage 9. Thus, the documents can be scanned so as to maintain a fixed length of the optical path between the second carriage 9 and the lens 10. The lens 10 is moved along its optical axis when the focal length is fixed and the magnification is varied.

The CCD line sensor 11 has elements each corresponding to one pixel of a document. The output of the sensor 11 is supplied to the A/D converter. The first and second carriages 7 and 9 and mirrors 12a and 12b are moved by a stepping motor (not shown). More specifically, the first and second carriages 7 and 9 are moved in accordance with an operation of the timing belt (not shown) between a drive pulley (not shown) and an idle pulley (not shown) coupled to a rotational axis of the stepping motor. The lens 10 is moved in the optical axis direction by rotation of a spiral shaft (not shown) of a stepping motor (not shown) corresponding to the lens 10.

In FIG. 1, reference numeral 60 denotes a semiconductor laser. A collimator 62, a polygon mirror (polyhedral reflector) 64, a lens 66, reflectors 68 and 70, and a lens 72 are arranged so as to correspond to the semiconductor laser 60.

The printer 3 is a combination of, e.g., a laser optical system and an electrophotographic system capable of forming an image on transfer paper. More specifically, the printer 3 has a photosensitive drum 50 serving as an image carrying body rotatably supported in substantially the central part thereof, and an exposure unit 52, a developer unit 54, a transfer charger 55, a separation charger 56, a cleaning charger 57, a discharger 58, and a charger 59 are arranged in sequence around the photosensitive drum 50. A laser beam is emitted from the exposure unit 52 to the photosensitive drum 50. The photosensitive drum 50 is uniformly charged by the charger 59, and an image is formed on a document on the drum 50 by the laser beam emitted from the scanner 2, thereby forming an electrostatic latent image.

The electrostatic latent image formed on the photosensitive drum 50 is developed by the developer unit 54, and the developed image is transferred by the transfer charger 55 onto copying paper P which is fed from a feeding cassette 30 serving as a feeding means (which will be described later) through a feeding roller 20 and an aligning roller 25. The copying paper P onto which the image is transferred, is separated by AC corona discharge by the separation charger 56. The separated paper P is carried to a fixer 71 through a carrying belt, and the developed image thereon is fixed by the fixer 71. The paper P is then discharged onto a discharge tray 74 by a pair of discharge rollers 73.

The developer remaining on the photosensitive drum 50 after the developed image is transferred onto the copying paper P and the paper P is separated, is removed by the cleaning charger 57, and the potential on the photosensitive drum 50 is decreased below a predetermined level by the discharger 58 to allow the next copying operation.

In a double-sided copy where an image is formed on both sides of copying paper P, the copying paper P on which the developed image is fixed by the fixer 71 is carried through a carrying path 75a and then stacked in a tray 75b. The stacked paper P one side of which is printed, is carried to the transfer charger 55 through a carrying path 75c, and the developed image is transferred to the other side of the paper P which has not yet been printed. A light reflection type paper sensor 75d is provided under the tray 75b in order to sense whether paper is stacked on the tray 75b or not.

The carrying path 75a, tray 75b, carrying path 75c and paper sensor 75d constitute an ADD (automatic duplexing device) 75 serving as an automatic duplexing mechanism.

A plurality of paper feeding cassettes 30 serving as paper feeding means, are arranged vertically such that they can freely be detached from the front of the copy machine. Each of the cassettes 30 has a cassette case 31 in which sheets of copying paper P are put, and a paper pickup end portion of the cassette case 31 is inclined in the sheet pickup direction. The sheets of copying paper P are picked up from the uppermost cassette case 31 by a pickup roller 81 and sent to the paper pickup end portion of the case 31. The sheets of copying paper P are then separated from one another by a sheet separation unit arranged above the paper pickup end portion of the cassette case 31 and including a paper feeding roller 84 and a separation roller (or separation pad) 85, and they are fed toward the printer 3.

An operation panel 80 for setting various copying conditions and starting copying operations is provided on the top of the copying machine and located above the scanner 2 and printer 3.

Figure 2:
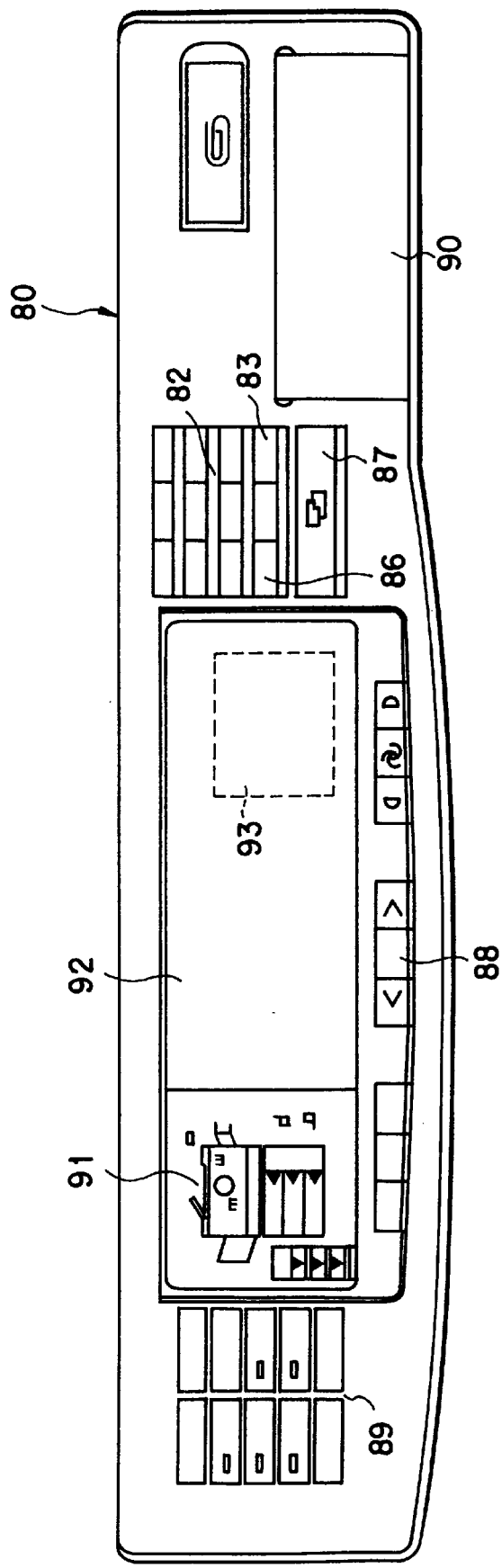
FIG. 2 is a view of the constitution of an operation panel of the electronic copy machine.

FIG. 2 illustrates a constitution of the operation panel 80. The operation panel 80 includes a ten-key 82 for inputting the number of copies, a clear key 83 for clearing the ten-key 82, an all-clear key 86 for setting a copying condition in the initial state, a start key 87 for starting a copy, a magnification selection key 88 for setting a magnification, a sorter key 89 for setting an additional sorter operation, keys 90 for switching between a single-sided copy and a double-sided copy, setting ADF and reversal operations, and the like, LED lamps 91 for displaying the status (no paper, caught paper, etc.) of the copy machine, an LCD display 92 for displaying an operation state by LCD, and a touch panel 93, provided on the display 92, for inputting an operation state.

Figures 3, 4:
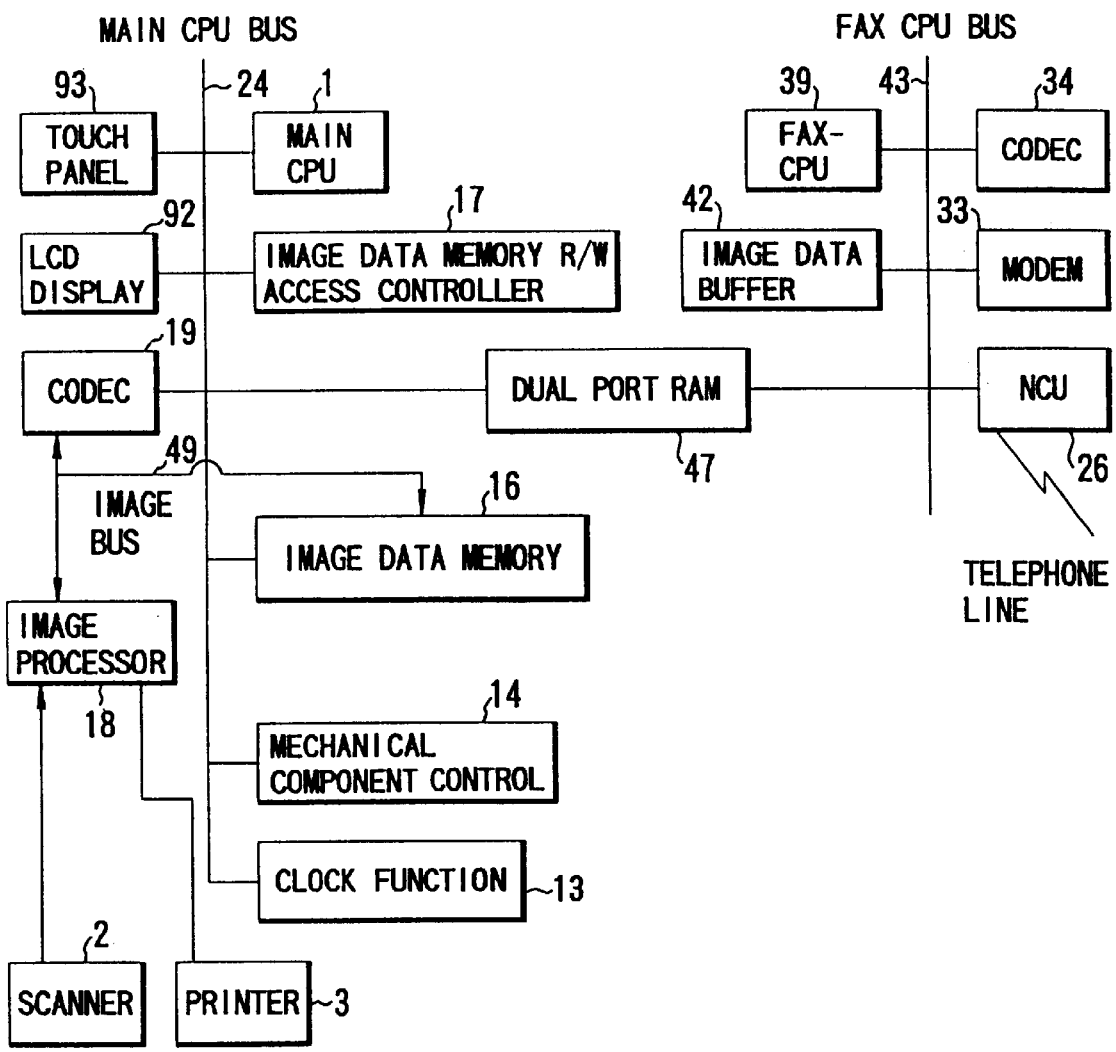
FIG. 3 is a block diagram showing the constitution of a control circuit of the electronic copy machine.
FIG. 4 is an illustration of storage spaces of image data in order of scanning.

FIG. 3 schematically shows a control circuit of the electronic copy machine described above.

As shown in FIG. 3, a main CPU 1 for controlling the entire copy machine, a clock function 13 for indicating a date and time, a mechanical component controller 14 for controlling the mechanism of the scanner 2 and printer 3, an image data memory 16 serving as a means for storing image data, an image data memory R/W access controller 17 for access-control an address of the stored image data, an image processor 18, connected to the scanner 2 and printer 3, for preprocessing and post-processing the image data, a CODEC 19 for coding the image data, an LCD display 92, and a touch panel 93 are connected to a CPU bus 24.

Furthermore, an NCU (network control unit) 26 connected to a telephone line as a facsimile transmission means, a modem 33 for connecting an analog line, a CODEC 34 for coding image data, a FAX-CPU 39 for controlling facsimile communication, and an image data buffer 42 for temporarily storing transmitted/received image data, are connected to a FAX CPU bus 43.

The main CPU bus 24 and FAX CPU bus 43 are connected to each other by a dual port RAM 47 for interface communication between the main CPU 1 and FAX-CPU 39.

The image processor 18 and CODEC 19 are connected to the image data memory 16 by an image bus 49.

According to the present invention, there are a plurality of resolutions for each of the main and sub scanning directions. When a document is placed in the A4-Y direction, its image is read with an assumed resolution corresponding to that of the image rotated or being transmitted by facsimile. The read image is rotated in the direction of A4-R and stored in the image data memory 16. The stored image data is transmitted by facsimile. Thus, an image degradation due to image rotation and conversion can be prevented.

The main CPU 1 changes the resolution of a read image by enlarging or reducing image data of one line in a software manner for the main scanning and by varying the speed of the first carriage 7 for the sub scanning.

In the sub scanning of the scanner 2, assume that the resolution of 16 lines/mm (the width of one pixel in the sub scanning direction is $\frac{1}{16}$ mm) in equal magnification is 100%.

In the normal scan, the following resolutions are:

3.85 lines/mm(100 dpi):(3.85/16)*100=24.0%

7.7 lines/mm(200 dpi):(7.7/16)*100=48.1%

15.4 lines/mm(400 dpi):(15.4/16)*100=96.3%

In the rotation scan, the following resolution are:

8 lines/mm:(8/16)*100=50%

16 lines/mm:(16/16)*100=100%

In the sub scanning of the scanner 2, assume that the scanning speed in resolution of 16 lines/mm and equal magnification is 100%.

In the normal scan, the scanning speeds for the respective resolutions are:

3.85 lines/mm(100 dpi):(16/3.85)*100=416%

7.7 lines/mm(200 dpi):(16/7.7)*100=208%

15.4 lines/mm(400 dpi):(16/15.4)*100=104%

In the rotation scan, the scanning speed for the respective resolutions are:

8 lines/mm:(16/8)*100=200%

16 lines/mm:(16/16)*100=100%

The image is rotated by storing image data read in sequence by the scanner 2 in the image data memory R/W access controller 17 and then rotating and writing the image data to the image data memory 16.

FIG. 4 is an illustration of image data stored in the controller 17 in order of scanning by the scanner 2.

The image data items read by the scanner are written to addresses 11 (starting address), 12, 13, . . . , 1n, 21, 22, 23, . . . , 2n, . . . , m1, m2, m3, . . . , mn. When the read image data is rotated to the left 90 degrees, the image data memory R/W access controller 17 causes the image data to be accumulated in the image data memory 16 in order of 1n, 2n, 3n, . . . , mn, . . . , 12, 22, . . . , 11, 21, 31, . . . , m1. When the read image data is rotated to the left 270 degrees, the controller 17 causes the image data to be accumulated in the image data memory 16 in order of m1, . . . , 31, 21, 11, m2, . . . , 32, 22, 12, . . . , mn, . . . , 3n, 2n, 1n.

Figure 5:
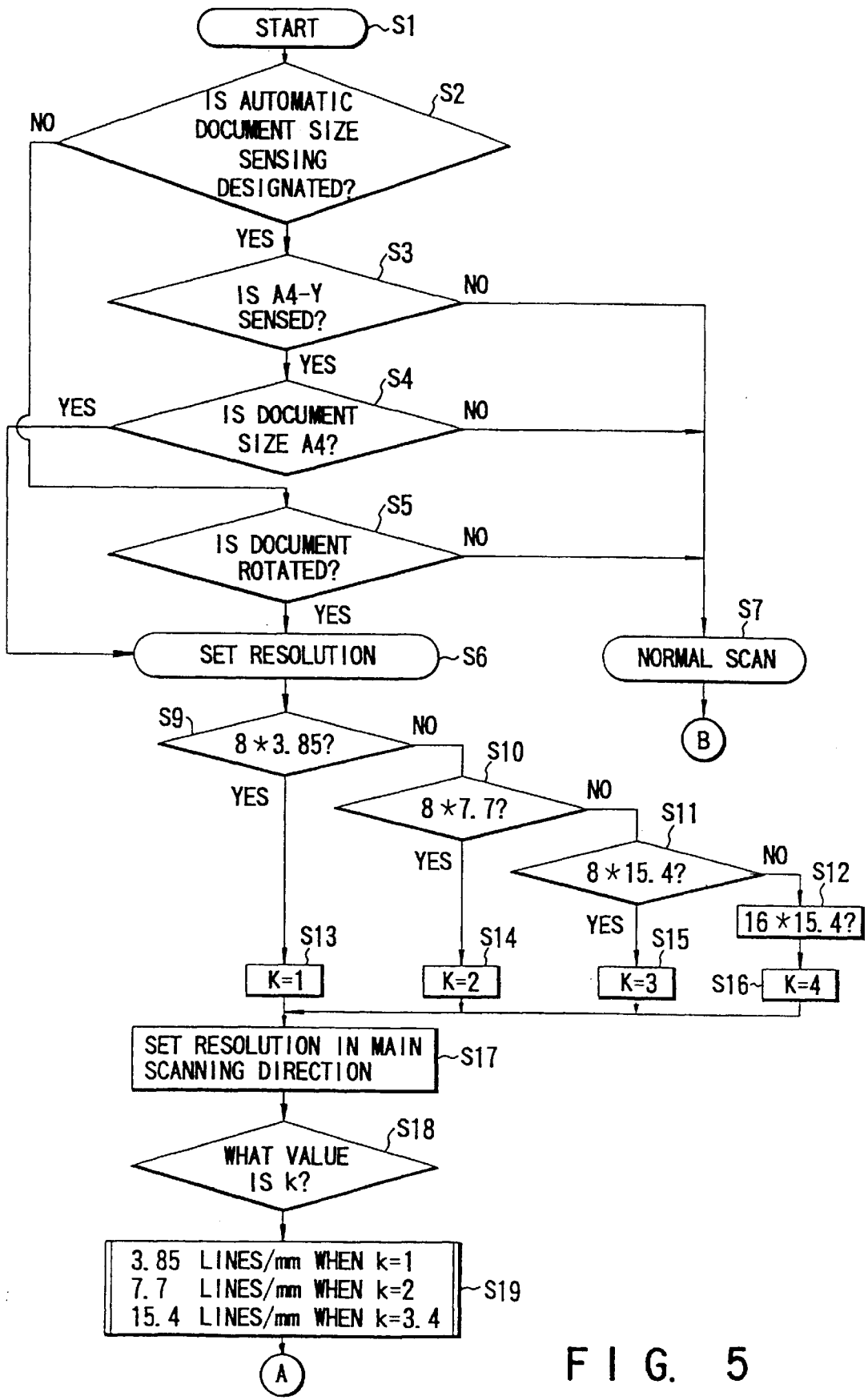
FIGS. 5 and 6 show a flowchart for explaining a facsimile operation of an A4-sized document.
Figure 6:
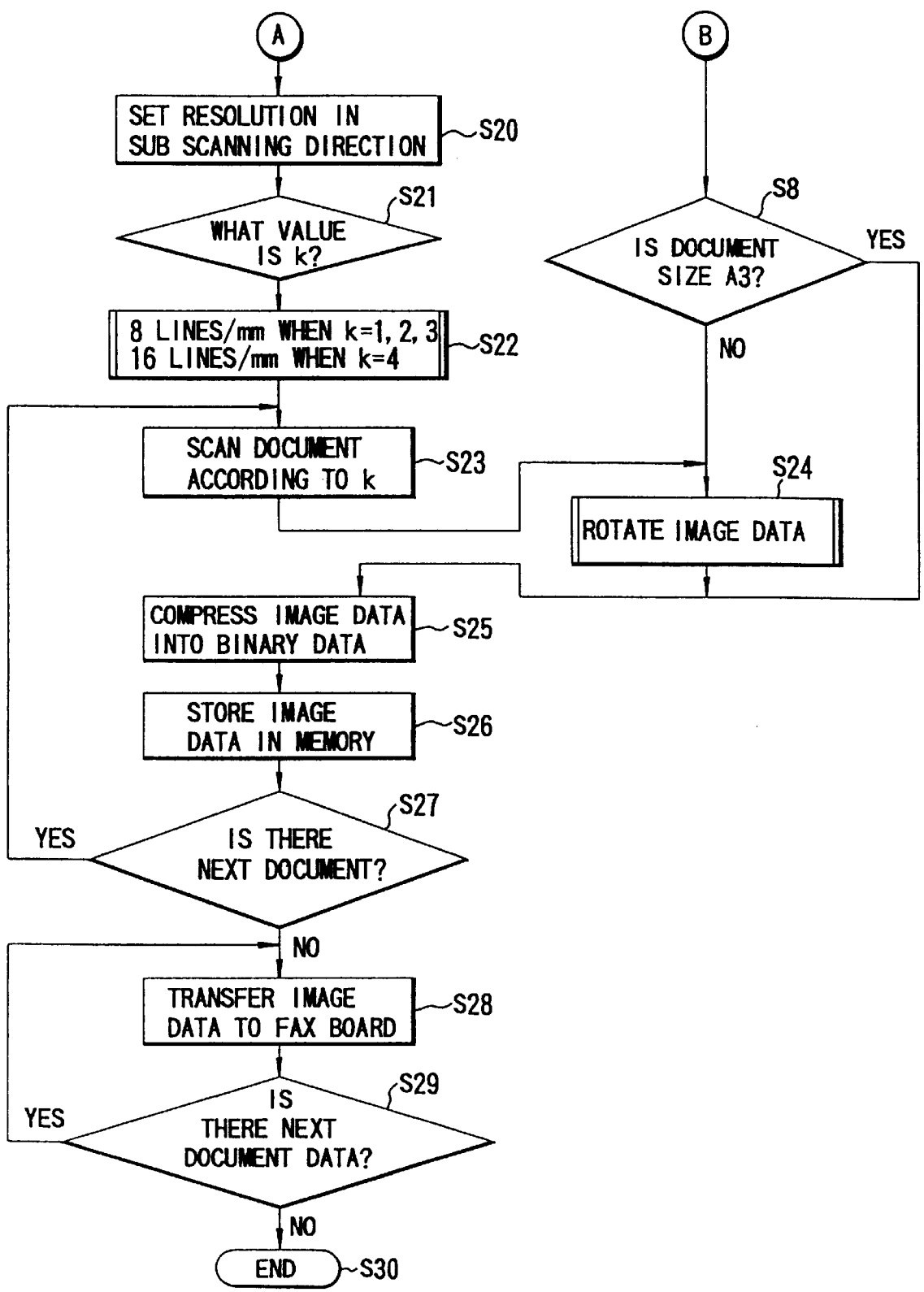
Figure 7A:
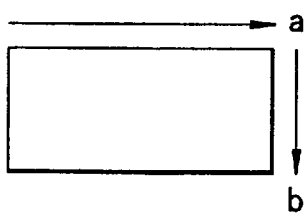
FIGS. 7A to 7D are views for explaining the resolution of a scanned image.
Figure 7B:
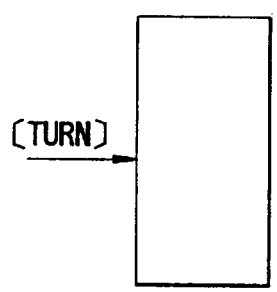
Figure 7C:
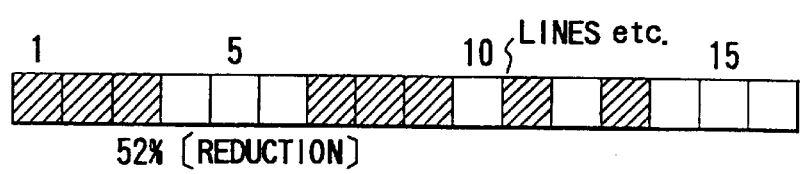
Figure 7D:
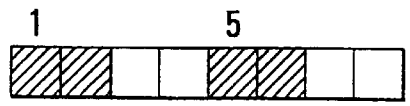

A facsimile operation for an A4-sized document in the electronic copy machine having the above constitution, will now be described with reference to the flowcharts of FIGS. 5 and 6.

When the operation starts (step S1), the LCD display 92 displays whether a user designates automatic document size sensing. The automatic document size sensing is designated by depressing the touch panel 93 (step S2).

When the automatic document size sensing is designated, it is sensed whether a document to be facsimiled is set in the A4-Y direction on the document feeding table 22 of the ADF 4 (step S3). If it is sensed in step S3 that the document is set in the A4-Y direction, the LCD display 92 displays whether the document is facsimiled as A4-R. A "YES" key is selected from the touch panel 93 and depressed when the document is transmitted as A4-R, while a "NO" key is selected therefrom and depressed when it is not done (step S4).

When the automatic document size sensing is not designated in step S2, the LCD display 92 displays whether the document image is rotated or not. The "YES" key is selected from the touch panel 93 and depressed when the image is rotated, while the "NO" key is selected and depressed when it is not rotated (step S5).

If it is sensed that the document is not set in the A4-Y direction in step S3 and if the "NO" key is depressed in steps S4 and S5, the document is scanned normally (step S7).

When the "YES" key is depressed in steps S4 and S5, a key of the touch panel 93 for selecting one of "normal", "fine", "very fine" and "hyperfine" as a resolution during the transmission, is displayed on the LCD display 92 and depressed (step S6).

It is determined whether the selected resolution is normal, that is, 8 lines/mm in the main scanning direction and 3.85 lines/mm in the sub scanning direction (step S9). If it is normal, k=1 (step S13).

If it is not normal, it is determined whether the resolution is fine, that is, 8 lines/mm in the main scanning direction and 7.7 lines/mm in the sub scanning direction (step S10). If it is fine, k=2 (step S14).

If it is not fine, it is determined whether the resolution is very fine, that is, 8 lines/mm in the main scanning direction and 15.4 lines/mm in the sub scanning direction (step S11). If it is very fine, k=3 (step S15).

If it is not very fine, it is determined whether the resolution is hyperfine, that is, 16 lines/mm in the main scanning direction and 15.4 lines/mm in the sub scanning direction (step S12). If it is fine, k=4 (step S16).

The resolution in the main scanning direction during the scanning by the scanner 2 is set (step S17) in accordance with the value of k. The resolution is 3.85 lines/mm when k=1, 7.7 lines/mm when k=2, and 15.4 lines/mm when k=3 and 4 (steps S18 and S19).

The resolution in the sub scanning direction during the scanning by the scanner 2 is set (step S20) in accordance with the value of k. The resolution is 8 lines/mm when k=1, 2 and 3, and 16 lines/mm when k=4 (steps S21 and S22).

After the resolution during the scanning is set in accordance with the value of k, the document is scanned by the scanner 2 (step S23) and, in this case, the resolution in the main scanning direction in the present invention corresponds to that in the sub scanning direction in the prior art, while the resolution in the sub scanning direction in the present invention corresponds to that in the main scanning direction in the prior art.

The image data read by the scanner 2 is rotated by the image data memory R/W access controller 17 (step S24) and compressed into binary data by the CODEC 19 (step S25). The binary data is stored in the image data memory 16 (step S26). If there is a document to be scanned next (step S27), the flow returns to step S23.

When the image data is read normally in step S7, it is determined in step S8 whether the size of the document is A3 or not. If NO, the image data is rotated (step S24) and, if YES, it is compressed into binary data (step S25).

The main CPU 1 transfers data from the image data memory 16 to the dual port RAM 47. The FAX-CPU 39 reads data out of the RAM 47 to perform a facsimile operation through the image data buffer 42, CODEC 34, modem 33, NCU 25, and telephone line (step S28) and, in this case, the FAX-CPU 39 transmits "k" indicative of resolution, together with the image data. If there is image data to be transmitted next (step S29), the flow returns to step S28.

If, in step S29, there is no image data to be transmitted, the communication ends (step S30).

As described above, according to the present invention, when the image read in the A4-Y direction by the scanner is facsimiled in the A4-R direction according to the ITU's recommendation, an image degradation due to a rotation of the read image can be prevented.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

I claim:

1. An image data transmitting/receiving apparatus, comprising:

a document table;

a scanning unit configured to scan a document on the document table in a main scanning direction and a sub scanning direction perpendicular to the main scanning direction to read image data of the document, the document having long sides and short sides perpendicular to the long sides, and the scanning unit further configured to read the image data at a first resolution along the main scanning direction and at a second resolution along the sub scanning direction when the short sides of the document are parallel to the main scanning direction;

a transmitting unit communicatively coupled to the scanning unit and configured to transmit the image data of the document scanned by the scanning unit to an external device;

a resolution setting unit communicatively coupled to the scanning unit and configured to determine which of the long and short sides of the document on the document table are parallel to the main scanning direction of the scanning unit, and, when the long sides of the document are parallel to the main scanning direction, to set a resolution along the main scanning direction of the scanning unit and a resolution along the sub scanning direction of the scanning unit to the second resolution and the first resolution, respectively;

a first control unit communicatively coupled to the scanning unit and configured to control the scanning unit such that the scanning unit scans the document at the resolution set by the resolution setting unit; and a second control unit communicatively coupled to the transmitting unit and configured to control the transmitting unit such that the image data of the document scanned by the scanning unit is rotated 90 degrees and the rotated image data is transmitted by the transmitting unit.

2. The apparatus according to claim 1, wherein said transmitting unit includes a storing unit for storing the image data of the document scanned by said scanning unit in a first order and reading the image data in a second order other than the first order to provide the rotated image data.

3. The apparatus according to claim 1, wherein said transmitting unit has a facsimile function to transmit the rotated image data to the external device through a telephone line.

4. The apparatus according to claim 1, wherein said transmitting unit includes a rotating unit for rotating the image data through one of 90 degrees and 270 degrees.

5. The apparatus according to claim 1, wherein said transmitting unit includes a rotating unit for rotating and coding the image data and storing the coded image data, and for reading and decoding the coded image data.

6. The apparatus according to claim 1, wherein said first control unit controls enlargement and reduction of the image data in the main scanning direction and a scanning speed of said scanning unit in the sub scanning direction thereby to vary the resolution of the image data scanned by said scanning unit.

7. The apparatus according to claim 4, wherein resolution of the image data is not changed by the rotating unit when it rotates the image data.

8. The apparatus according to claim 2, wherein reading of the image data from the storing unit according to the second order results in a rotation of the image data while not changing the resolution of the image data with respect to reading of the image data from the storing unit according to the first order.

9. An image data transmitting/receiving apparatus comprising:
   a scanner for scanning a document having long sides and short sides in a main scanning direction and a sub scanning direction to read image data of the document;
   means for determining whether the long sides of the document are parallel to the main scanning direction or the sub scanning direction;
   means for setting a resolution of the image data along the short sides and a resolution of the image data along the long sides that are used during transmission of the image data to an external device;
   means for controlling said scanner such that when the long sides of the document are parallel to the main scanning direction, said scanner scans the document in the main scanning direction by the resolution along the long sides that is used during said transmission, and scans the document in the sub scanning direction by the resolution along the short sides that is used during said transmission, thereby to read an image;
   means for rotating the image data of the document scanned by said scanner through 90 degrees to provide rotated image data; and
   means for transmitting the rotated image data to the external device.

10. The apparatus according to claim 9, wherein said image rotation means includes means for rotating and coding the image data and storing the coded image data, and for reading and decoding the coded image data.

11. The device according to claim 9, wherein a set of resolutions along the short sides and long sides of the document is one of 8 lines/mm and 3.8 lines/mm, respectively, and 16 lines/mm and 15.4 lines/mm, respectively, and when the long sides of the document are parallel to the main scanning direction, said control means control said scanner such that said scanner scans the document in the main scanning direction by the resolution of 3.85 lines/mm and scans the document in the sub scanning direction by the resolution of 8 lines/mm when the resolutions along the short sides and long sides of the document are set to 8 lines/mm and 3.85 lines/mm, respectively, by said setting means, and said scanner scans the document in the main scanning direction by the resolution of 15.4 lines/mm and scans the document in the sub scanning direction by the resolution of 16 lines/mm when the resolutions are set to 16 lines/mm and 15.4 lines/mm, respectively by said setting means.

12. The apparatus according to claim 9, wherein said image rotation means includes means for storing the image data of the document scanned by said scanner in a first order and reading the image data in a second order other than the first order to provide the rotated image data.

13. The apparatus according to claim 9, wherein said transmission means has a facsimile function to transmit the rotated image data to the external device through a telephone line.

14. The apparatus according to claim 9, wherein the transmitting means transmits the rotated image data to the external device in the sub scanning direction at a first resolution that coincides with the resolution by which the scanner scans the document in the main scanning direction, and
   wherein the transmitting means transmits the rotated image data to the external device in the main scanning direction at a second resolution which coincides with the resolution by which the scanner scans the document in the sub scanning direction.

15. A method of forming an image, comprising the steps of:
   determining whether long sides of a document placed on a table are parallel to a main scanning direction of a scanner or a sub scanning direction thereof;
   setting resolutions of image data along the long sides and short sides of the document that are used during transmission of the image data to an external device;
   scanning the document in the main scanning direction by the resolution along the long sides that is used during the transmission of the image data and in the sub scanning direction by the resolution along the short sides that is used during the transmission of the image data when the long sides of the document are parallel to the main scanning direction, thereby to read image data from the scanned document;
   rotating the read image data 90 degrees; and
   transmitting the rotated image data to the external device.

* * * * *